United States Patent [19]

Buckman et al.

[11] 3,728,543
[45] Apr. 17, 1973

[54] THERMOLUMINESCIENCE OF SAPPHIRE

[75] Inventors: William Gordon Buckman; David C. Sutherland; David W. Cooke, all of Bowling Green, Ky.

[73] Assignee: The United States of America as represented by the Secretary of Department of Health, Education and Welfare

[22] Filed: Nov. 23, 1971

[21] Appl. No.: 201,458

[52] U.S. Cl..............................250/71 R, 250/83 CD
[51] Int. Cl.................................................G01f 1/11
[58] Field of Search......................250/71 R, 83 CD, 250/83.3 UV

[56] References Cited

UNITED STATES PATENTS

| | | | |
|---|---|---|---|
| 3,388,252 | 6/1968 | Medlin | 250/71 R |
| 3,600,579 | 8/1971 | Carpentier et al. | 250/71 R |

*Primary Examiner*—Archie R. Borchelt
*Attorney*—John C. Holman et al.

[57] ABSTRACT

A novel technique and dosimetric material is disclosed for the detection and measurement of ultraviolet radiation. Nominally pure sapphire containing trace impurities such as manganese, chromium, iron and titanium is ground into a powder form of approximately 200 mesh particle size. The sapphire is then excited with incident ultraviolet radiation and subsequently heated whereby the sapphire thermoluminesces. The intensity of the resulting luminescence is a measure of the ultraviolet radiation dosage to which the sapphire has been exposed.

6 Claims, 4 Drawing Figures

3,728,543

THERMOLUMINESCIENCE OF SAPPHIRE

BACKGROUND OF THE INVENTION

This invention generally relates to dosimetric materials for the measurement of incident radiation and particularly concerns a thermoluminescent material for the measurement of ultraviolet radiation.

Ultraviolet radiation has found widespread use in many different environments. For example, the germicidal effects of ultraviolet radiation can be utilized for the disinfection of various materials, and ultraviolet radiation has numerous technical applications in medical therapy, as is known. Apart from these beneficial uses, ultraviolet radiation still constitutes a potential hazard to man since it can produce conditions such erythema and conjunctivitis, as well as other injuries and disease, quite possibly even including cancer of the skin.

Care must therefore be taken when undergoing treatment with ultraviolet radiation and, in this respect, certain limits for exposure tolerance of $0.1\mu$ watt/cm$^2$ has been set for continuous radiation exposures from typical germicidal lamps by the Counsel on Physical Medicine and Rehabilitation of the American Medical Association. By way of example and as a means for comparison of magnitude, a typical commercially available 15 watt General Electric G15TH germicidal lamp yields an ultraviolet intensity on the order of $75\mu$ watts/cm$^2$ at a distance of 1 meter from the central portion of the tube.

In view of these inherent hazards, many monitoring techniques have been developed for measuring and detecting ultraviolet radiation in an effort to prevent deleterious over exposure. For example, photoelectric cells, photomultiplier tubes, and chemical photolysis have been utilized as dosimetric instruments with some degree of success. However, for the most part the existing dosimetric instruments for monitoring ultraviolet radiation do not have an adequate low end sensitivity so as to measure ultraviolet radiation from below about $0.1\mu$watt/cm$^2$ up to very high levels of exposure, such as $5,000\mu$watts/cm$^2$. Existing dosimetric instruments further suffer from disadvantages with respect to their unwieldy size, lack of portability, unstable operation, and operation affected not only by ultraviolet radiation, but also by such common radiation as is emitted by normal room lights which causes erroneous readings.

SUMMARY OF THE INVENTION

Accordingly, a need exists for an ultraviolet detector or dosimeter which does not exhibit the disadvantages of prior art apparatus and materials as above-discussed. It is the primary objective of the instant invention to provide such an improved dosimeter.

A further and more specific object of the instant invention is the provision of an ultraviolet dosimetric technique and material which is operative to detect and measure ultraviolet radiation from very low levels, such as below $0.1\mu$watt/cm$^2$, up to relatively high levels of exposure, the incident ultraviolet radiation having an energy in the range of about 3 to 5 electron volts.

Another objective of the instant invention concerns the provision of an ultraviolet radiation detector or dosimeter which is small, portable, stable, and unaffected by normal room lights.

These objects, as well as others which will become apparent as the description proceeds, are implemented by the instant invention which, as aforestated, comprises a novel dosimetric technique and apparatus for the detection of ultraviolet radiation. In this respect, it has been discovered that so-called "nominally pure" sapphire will function as a suitable dosimetric material for the detection of ultraviolet radiation. Nominally pure sapphire is, of course, a term of art and, in the preferred inventive embodiment to be discussed hereinbelow, the sapphire contains a trace impurity of at least one member selected from the group consisting of manganese, chromium, iron and titanium.

The nominally pure sapphire is contemplated to be crushed into a particle size of approximately 200 mesh and thereafter excited with incident ultraviolet radiation. The sapphire powder is subsequently heated after excitation, whereby the sapphire has been found to thermoluminesce. The resulting luminescence can be measured as indicative of the incident radiation dosage to which the sapphire has been subjected.

BRIEF DESCRIPTION OF THE DRAWINGS

The invention itself will be better understood and further features and advantages thereof will become apparent from the following detailed description of a preferred inventive embodiment, such description making reference to the appended sheets of drawings, wherein.

DETAILED DESCRIPTION OF A PREFERRED INVENTIVE EMBODIMENT

At the outset of this description and for purposes of better understanding the impact of the instant inventive technique, it should be understood that many studies have been undertaken in the art relative to the thermoluminescent properties of aluminum oxide which, as is known, constitutes a major ingredient of sapphire. In this respect, reference can be had to an article authored by J. P. Rieke and S. Daniels, "Thermoluminescence Studies of Aluminum Oxide," Journal of Physical Chemistry, 61, 629–633 (1957). Yet, the thermoluminescence of aluminum oxide which has previously been detected is the result only of an exposure of the samples to high energy radiation such as X-radiation and gamma radiation. Such high energy radiation was believed to be necessary since the solid state band gap of sapphire is on the order of 8.66eV, and in such previous prior art studies, no detectable thermoluminescence was noted of sapphire excited with a relatively low energy source, such as ultraviolet radiation.

Applicants have discovered, however, that so-called "nominally pure" sapphire does indeed exhibit thermoluminescent properties after excitation by incident ultraviolet radiation. In this respect, nominally pure sapphire of the type utilized with the instant invention has been found to contain a trace impurity of at least one member selected from the group consisting of manganese, chromium, iron and titanium.

The nominally pure sapphire crystals are contemplated to be crushed into a powder form of approximately 200 mesh particle size through the utilization of a stainless steel mortar and pestle, for example. Subsequently, the sapphire powder is annealed by heating for fifteen minutes in an air oven at 400° C, for example, and the allowed to cool to room temperature.

The prepared powder is then excited by various sources of incident ultraviolet radiation, such as the germicidal lamp described at the outset of this specification. Subsequently, the excited sapphire powder is heated at a rate of about 20° C/min whereby the sapphire will thermoluminesce. The resulting luminescence is measured as an indicator of the incident radiation and particularly as an indicator of the total radiation dose received by the sapphire material.

Figure 1:
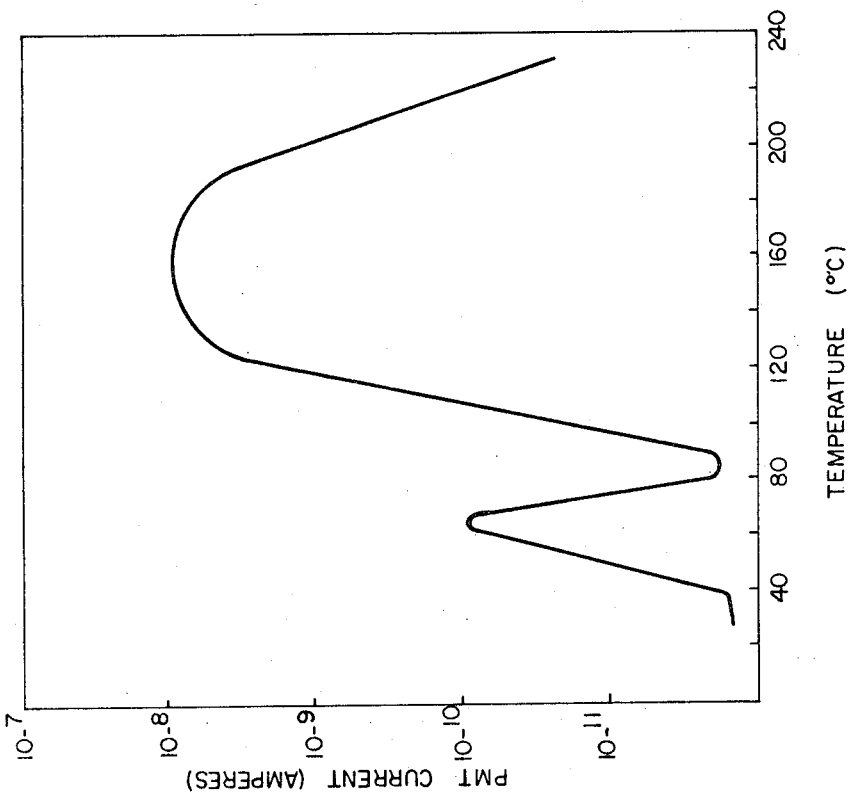
FIG. 1 is a graphical illustration of the thermoluminescence glow curve of sapphire after ultraviolet radiation excitation.

Referring specifically to FIG. 1 of the appended drawings, the thermoluminescence glow curve of a sapphire sample after ultraviolet radiation excitation is depicted. In this test, the sapphire samples were heated to a maximum temperature of 240° C at a rate of about 70° C/sec and it should be noted that a small 65° C peak and a relatively large and broad 165° C peak were so produced.

Figure 3:
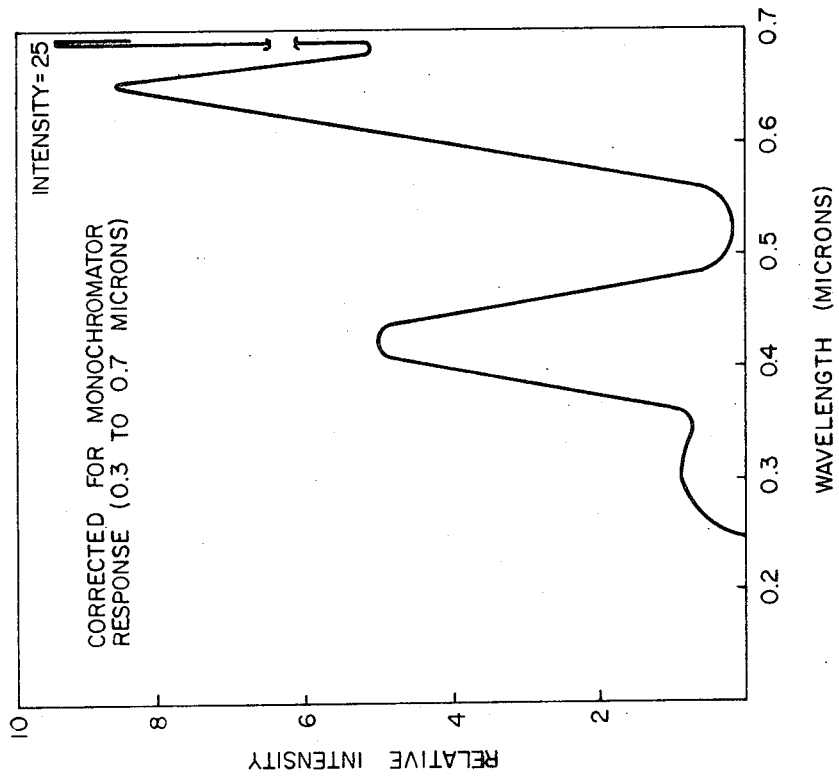
FIG. 3 is a graphical illustration of the thermoluminescent emission spectrum of sapphire after ultraviolet excitation, the emission spectrum being corrected for monochromator response.

The thermoluminescence emission spectrum of the sapphire samples after ultraviolet excitation as above-described is depicted in FIG. 3 of the appended drawings and, here, it should be noted that apparent peaks in the emission spectrum occur at wavelengths corresponding to 290nm and 410nm, the significance of which will be discussed hereinbelow in conjunction with an explanation of these results and the proposition of a tentative theory or model to explain the sensitivity of nominally pure sapphire to ultraviolet radiation.

Figure 2:
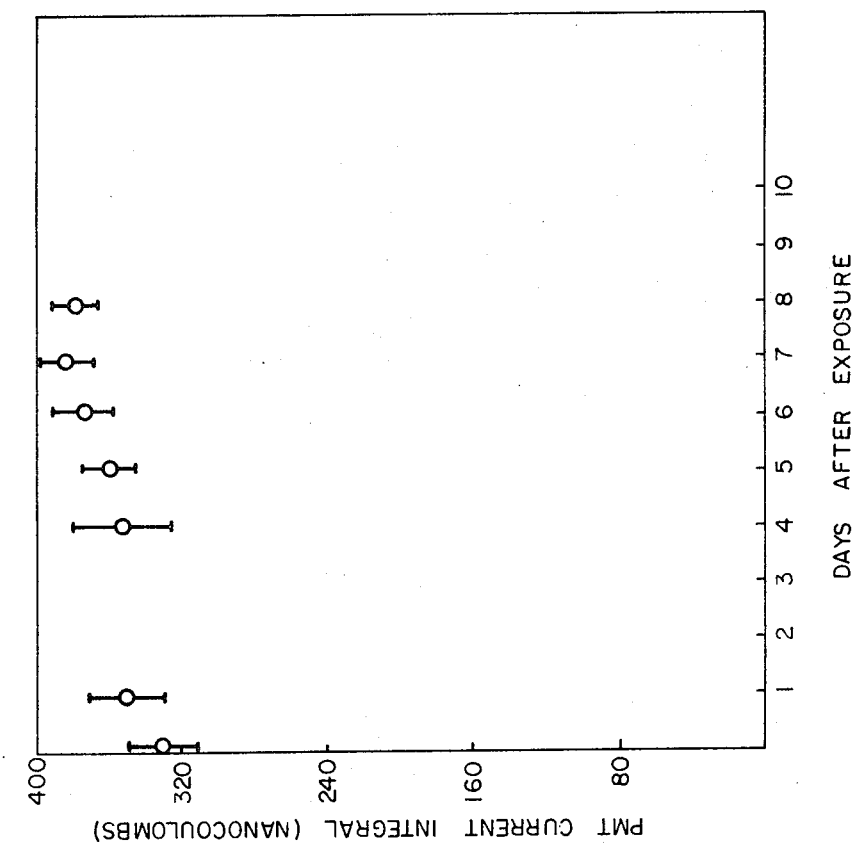
FIG. 2 is a graphical representation of the stability of sapphire at room temperature.

The desirability of nominally pure sapphire as an ultraviolet radiation dosimetric material is further illustrated by the ability of nominally pure sapphire to retain for relatively long intervals the energy absorbed from the impinging ultraviolet radiation. In this respect, attention is directed to FIG. 2 of the appended drawings wherein it is seen that the current integral of the thermoluminescence glow curve after various storage times is stable for at least 8 days.

Figure 4:
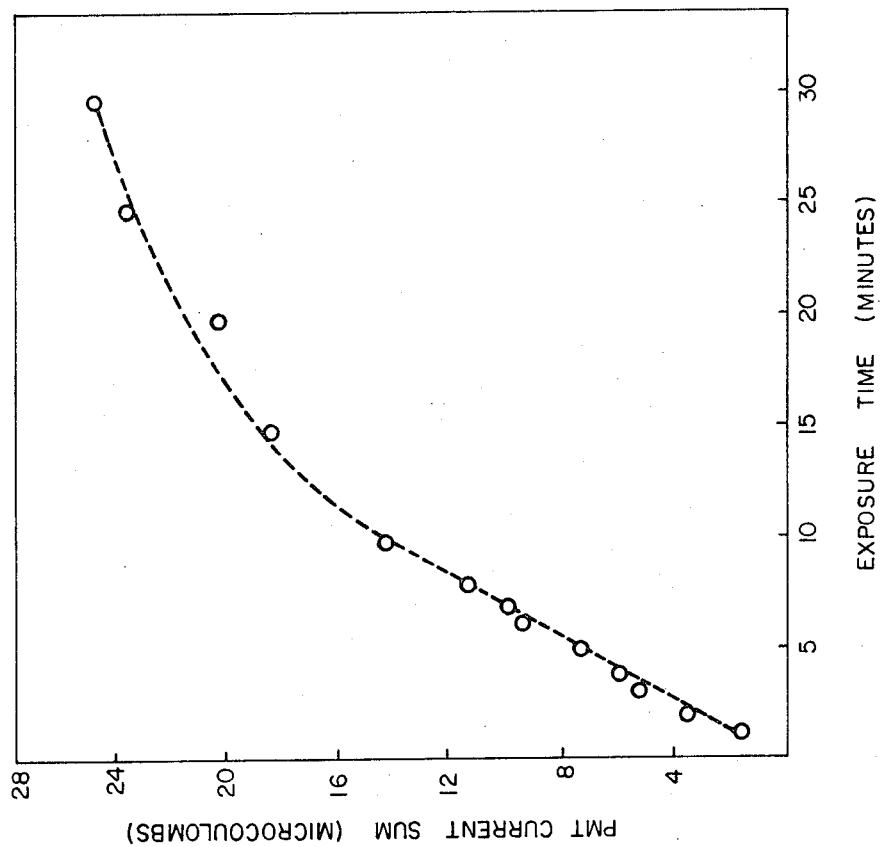
FIG. 4 is a graphical illustration of the integrated thermoluminescence glow curve current versus exposure to a typical ultraviolet germicidal lamp.

Referring now to FIG. 4 of the appended drawings, the integrated glow curve current as a function of the length of exposure to a relatively complete spectrum of a germidical lamp, such as the ultraviolet lamp discussed above, is depicted, the exposure rate being approximately 10$\mu$watts/cm$^2$. It should be observed that the integrated glow curve is linear for low ultraviolet exposure and becomes nonlinear after approximately ten minutes of exposure times. Samples exposed to intensities below 0.3$\mu$watt/cm$^2$ for thirty minutes have been found to yield appreciable thermoluminescence and it is expected that very low ultraviolet radiation levels can be measured by simply extending the exposure time, since the method of detection, as is standard, comprises an integration method.

Furthermore, and during various tests of the nominally pure sapphire powder of the instant invention, the powder was found to be largely unaffected by excitation to normal room lights, thus insuring that the subsequent thermoluminescence is a direct function of incident ultraviolet radiation. In this respect, several nominally pure sapphire samples were exposed to a 15 watt fluorescent bulb at a distance of approximately 1 inch. After a 3 hour exposure, it was found that only a very small 65° C peak was observed in the thermoluminescent response curve, this peak contributing less than 1/25 of the total thermoluminescence in the normal glow curves of ultraviolet radiation excited sapphire. The peak also has been found to rapidly decay at room temperature and, in fact, becomes virtually nonexistant after the sample remains at room temperature for approximately 15 minutes. Accordingly, it can be said that nominally pure sapphire as a dosimetric material is unaffected by normal room lights, a primary criteria for any device which monitors ultraviolet radiation.

It should therefore be appreciated that nominally pure sapphire, as discovered by Applicants, possesses a number of characteristics highly desirable in the dosimetry art for the detection of ultraviolet radiation. Specifically, and in summary, nominally pure sapphire has been found to exhibit a high sensitivity to relatively low levels of ultraviolet exposure, a relatively linear response at low exposure, a stability at room temperature for at least 8 days, a desirable emission spectrum that adequately matches the response of the typical photomultiplier tube commonly utilized in thermoluminescent studies, as well as a negligible stimulation by room lights.

The exact mechanism by which nominally pure sapphire exhibits thermoluminescent properties in response to ultraviolet radiation as above-described is not, as yet, known to applicants. Of course, it is clear that the typical thermoluminescent mechanism normally to be expected of sapphire in response to X-radiation or gamma radiation does not offer an adequate explanation. As discussed above, the band width of sapphire, being of approximately 8.66eV, exhibits too high an energy level for excitation to be expected to occur after exposure to incident ultraviolet radiation. Applicants can, however, advance a tentative model or theory by which these unusual and unexpected thermoluminescent results may be explained. In this respect, and as an example, it is thought that upon exposure of the nominally pure sapphire to ultraviolet radiation, the iron and titanium trace impurities become further ionized and electrons are released and go to electron traps. Upon heating the sapphire, those electrons in the traps are released and travel to the iron and titanium irons that serve as luminescence centers. It is theorized that the iron serves to produce the noted 290nm emission peak and that titanium produces the 410nm emission peak noted in the curve of FIG. 3.

It should now be apparent that the objects initially set forth at the outset to this specification have been successfully achieved.

Accordingly, what is claimed is:

1. A method of detecting ultraviolet radiation comprising the steps of:
   exciting nominally pure sapphire with incident ultraviolet radiation;

subsequently heating the excited sapphire whereby the sapphire thermoluminesces; and measuring the resulting luminescence as an indicator of the incident radiation.

2. A method as defined in claim 1, wherein the sapphire is in a powder form.

3. A method as defined in claim 1, wherein the nominally pure sapphire contains a trace impurity of at least one member selected from the group consisting of manganese, chromium, iron and titanium.

4. A method as defined in claim 2, wherein the particles of the sapphire powder are of about 200 mesh size.

5. A thermoluminescent dosimeter responsive to ultraviolet radiation consisting of nominally pure sapphire.

6. A dosimeter as defined in claim 5, wherein the nominally pure sapphire contains a trace impurity selected from the group consisting of manganese, chromium, iron and titanium, and wherein the sapphire is in a powder form with particles of about 200 mesh size.

* * * * *